Dec. 12, 1967 G. B. HUMPHREYS 3,357,917
DESALINATION BY OSMOSIS AND CHANGE OF STATE
Filed Sept. 21, 1964
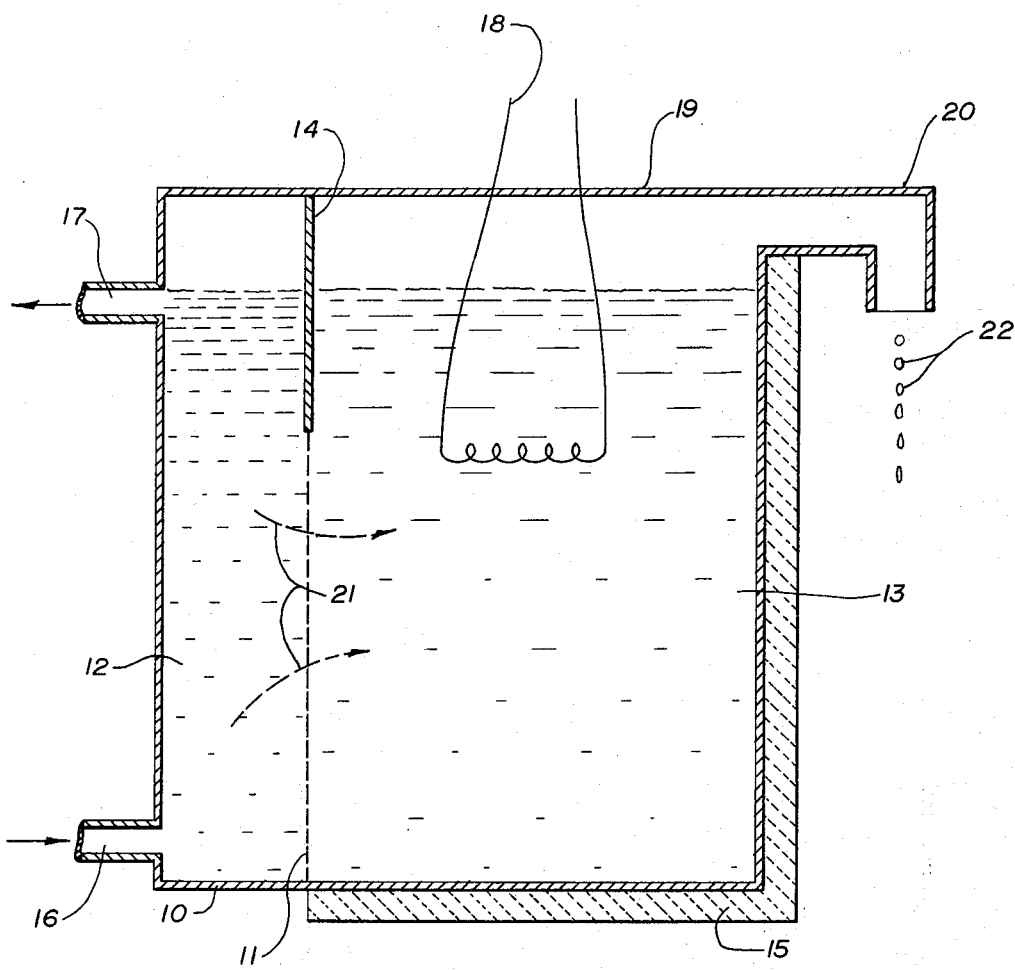
INVENTOR.
GEORGE B. HUMPHREYS
BY
ATTORNEY

United States Patent Office 3,357,917
Patented Dec. 12, 1967

3,357,917
DESALINATION BY OSMOSIS AND
CHANGE OF STATE
George B. Humphreys, Lafayette, Calif., assignor to
Kaiser Industries Corporation, Oakland, Calif.
Filed Sept. 21, 1964, Ser. No. 398,020
5 Claims. (Cl. 210—22)

This invention relates to a method for economically recovering fresh water from saline water.

The process of this invention produces pure water from saline water by employing a system which combines osmosis and change of phase. By the use of this novel process, after a relatively small inventory of heat is added to or removed from the system to bring it to or near a change-of-phase temperature, the only further heat requirements of the process are to change the temperature of the fresh water produced to the change-of-phase temperature, and to provide the necessary heat of vaporization or heat of fusion.

In conventional processes for recovering fresh water from saline water that are based on a change of phase, the whole body of saline water must be at or near the change-of-phase temperature in order to convert some water to the solid or vapor phase. For example, in a conventional process for obtaining pure water by evaporation from a body of saline water, the entire body of saline water must be heated to its boiling point before a vapor phase can be produced, removed and condensed. The use of multiple stages with partial vacuum and efficient heat exchange between streams can recover much of the heat added to the water to produce vaporization, but a voluminous discharge stream at a higher temperature than the input stream necessarily carries away copious amounts of energy. Only by evaporation to dryness can this energy loss be avoided, and evaporation to dryness cannot be employed for other more compelling reasons such as clogging of pipes, scaling of heat exchange surfaces, etc.

In accordance with this invention fresh water is produced from saline water by maintaining a substantially non-flowing body of relatively concentrated brine separated by a semi-permeable membrane from a flowing body of relatively dilute brine. Means are provided in the substantially non-flowing body to change its temperature to be at the change-of-phase temperature of the brine. In the context of this invention the term *substantially non-flowing* is used to describe a body that is not flowing except in the sense that there is a continuous addition of fresh water through the membrane, that it may be necessary to make up losses, and there may be an exchange of relatively concentrated brine between vessels in a multi-stage system. The term *change of phase* as employed in this description means changing the phase of liquid water to vapor or solid. The term *semi-permeable membrane* is used in this description in the usual sense, to define a membrane through which osmosis can occur, in this case a membrane that will pass water molecules but will not pass salt ions. Water flows through such a semi-permeable membrane from a less concentrated body of liquid to a more concentrated body, and the greater the concentration difference, the greater the driving force for such flow. Such membranes may be natural, e.g. animal tissue, or synthetic, such as specially prepared forms of cellulose acetate which are commercially available.

The process of this invention can best be explained with reference to the accompanying drawing which illustartes in very general terms the elements of the process. The drawing is a highly schematic elevation sectional view of a general case of the invention.

As illustrated in the drawing a covered metal tank generally designated 10 is separated by a semi-permeable membrane 11 into a chamber 12 containing a flowing stream of relatively dilute brine and a chamber 13 containing a substantially non-flowing body of relatively concentrated brine. The comparative term *relatively* is used herein to define the concentration of the various brines relative to each other rather than comparing them to an absolute standard. The chamber 13 desirably has a layer of insulation 15 surrounding it and the membrane 11 desirably is entirely beneath the brine, being connected to a baffle 14 which is in turn sealed against the lid 19. A line 16 is provided for introducing brine into the chamber 12 and a line 17 is provided for removing brine from the chamber 12. A change of phase means 18 is placed in the relatively concentrated brine in chamber 13 which is shown here schematically as a coil through which a hot fluid may flow in order to boil water in chamber 13, or alternatively, a cold fluid may flow in order to freeze water from the relatively concentrated brine in chamber 13. A harvesting means 20 for recovering the non-liquid phase is also shown schematically. The harvesting means 20, for example, may be an enclosure over the surface of the relatively concentrated brine that is adapted to collect vapor phase water and transport it to a condenser where it is converted back to liquid phase, or it may be any of the many means for separating ice crystals from brine, for example strainers, surface skimmers etc. It is also within the scope of this invention to combine the harvesting means and the phase changing means, for example employing a cooled rotating cylinder which dips into the relatively concentrated brine causing ice to freeze on its surface which is subsequently removed and collected. Change of phase may also be caused directly as by expanding a compressed or condensed gas directly in the relatively concentrated brine.

In operation, both chambers 12 and 13 may be first filled with brine from which it is desired to extract pure water. Initially, the concentration and the temperature of the brine in both chamber 12 and chamber 13 are the same. However, when the temperature in chamber 13 reaches the change-of-phase temperature, water is extracted from the brine in chamber 13 by change of phase and harvesting, and as a result of removing water the brine in chamber 13 becomes more concentrated than the brine in chamber 12. As soon as a concentration gradient between chambers 12 and 13 exists, water flows through the semi-permeable membrane, the flow being illustrated schematically by broken-line arrows 21. The tendency for brine in chamber 12 to become more concentrated is overcome by the continuous flow of fresh brine into chamber 12 which is desirably maintained at a rate that will keep the brine in chamber 12 substantially at the concentration of the brine source, for example, sea water.

The stagnant body of brine in chamber 13 need not have a source of fresh brine and removal of fresh water from that body of brine causes it to become and remain concentrated relative to the flowing stream in chamber 12. If there are entrainment losses from the chamber 13, make-up will be added. Accordingly, there is a continuous flow of fresh water from the chamber 12 through the semi-permeable membrane 11 and into the chamber 13.

In the embodiment of this invention wherein water is recovered from chamber 13 by being boiled or converted to vapor phase, when the body of brine in chamber 13 is held at its boiling point only the energy required to boil the water to be harvested is necessary except for replacing small heat losses due to conduction through the chamber walls and semi-permeable membrane. However, it is not necessary to heat the large body brine passing through chamber 12 because that brine is not boiled. After the initial inventory of heat is added to the system, there is in effect a continuous flow of fresh water through the membrane, through the concentrated brine, to the boiler, and ultimately through the harvesting means. The flow rate of stream 21 through the membrane is substantially equal to the flow rate of stream 22, the harvested pure water. The heat requirement of the system is only that needed to heat and boil the fresh water.

The process of this invention lends itself to many variations and modifications that are useful within the broad scope of the invention. To mention a few, rather than using two distinct chambers, the relatively dilute brine and relatively concentrated brine may be on opposite sides of tubes formed from the semi-permeable membrane, other means for increasing the area of the membrane may be employed, or a positive pressure or elevation difference may be imposed on the surface of the relatively dilute brine to increase the rate at which fresh water passes through the membrane, and the membrane may be mechanically supported on a screen or perforated plate.

Heating or cooling may be effected with circulating insoluble solids which are plunged directly into the relatively concentrated brine, or several stages may be employed to recover latent heat.

The chambers may be completely enclosed, adapted to run under pressure or vacuum, shaped or otherwise adapted to aid creation of and recovery of a non-liquid phase and provided with controls for temperature, level, flow rate, salinity and other process variables. The relatively concentrated brine may contain different, more soluble salts than the relatively dilute brine and its pH may be adjusted to increase solubility or otherwise promote osmosis and recycle streams may be employed for washing or otherwise purifying the non-liquid phase before it is reconverted to liquid phase product.

The heat of fusion or heat of vaporization may be recovered by using several stages at different pressures, by compressing vapors, by cooling compressed refrigerants, etc. Also, the process may be employed to dehydrate, where the recovery of water is not the primary consideration as in removing water from constant boiling mixtures. In this context, the terms *brine* and *saline* will include solutions other than solutions of salts.

What is claimed is:

1. A process for producing fresh water from saline water which comprises maintaining a flowing body of relatively dilute brine and a substantially non-flowing body of relatively concentrated brine on opposite sides of a semi-permeable membrane, changing the phase of water within said relatively concentrated brine and harvesting the resultant non-liquid phase.

2. Claim 1 wherein water is changed to vapor phase.

3. Claim 1 wherein water is changed to solid phase.

4. Claim 1 wherein said relatively dilute brine and said relatively concentrated brine contain different solutes.

5. An apparatus for producing fresh water from saline water which comprises a first chamber and a second chamber, a semi-permeable membrane separating said first chamber from said second chamber, means for introducing liquid into said first chamber, means for removing liquid from said first chamber, means to change the phase of liquid in said second chamber and means for recovering non-liquid phase from said second chamber.

References Cited

UNITED STATES PATENTS

| | | | |
|---|---|---|---|
| 2,712,386 | 7/1955 | Jones et al. | 210—321 X |
| 2,720,980 | 10/1955 | Thomas | 210—22 X |
| 2,772,782 | 12/1956 | Jansma | 210—321 X |

JOSEPH SCOVRONEK, *Acting Primary Examiner.*

MORRIS O. WOLK, *Examiner.*

E. G. WHITBY, *Assistant Examiner.*